United States Patent
Munekuni

(10) Patent No.: US 8,629,846 B2
(45) Date of Patent: Jan. 14, 2014

(54) INFORMATION PROCESSING APPARATUS AND INFORMATION PROCESSING METHOD

(75) Inventor: Masaji Munekuni, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 12/776,698

(22) Filed: May 10, 2010

(65) Prior Publication Data

US 2010/0289766 A1    Nov. 18, 2010

(30) Foreign Application Priority Data

May 13, 2009 (JP) ................................ 2009-116839

(51) Int. Cl.
*G06F 3/041* (2006.01)

(52) U.S. Cl.
USPC ........................................ 345/173; 178/18.03

(58) Field of Classification Search
USPC ......... 345/156–179; 178/18.01–18.09, 18.11, 178/19.01–19.07
See application file for complete search history.

(56) References Cited

U.S. PATENT DOCUMENTS

| | | | | |
|---|---|---|---|---|
| 5,761,340 A | * | 6/1998 | Suzuki | 382/189 |
| 6,111,976 A | * | 8/2000 | Rylander | 382/114 |
| 7,292,727 B2 | * | 11/2007 | Geidl et al. | 382/188 |
| 2003/0071850 A1 | * | 4/2003 | Geidl | 345/781 |
| 2005/0132301 A1 | * | 6/2005 | Ikeda | 715/812 |
| 2008/0240569 A1 | * | 10/2008 | Tonouchi | 382/186 |

FOREIGN PATENT DOCUMENTS

JP    H08-263688 A    10/1996

* cited by examiner

*Primary Examiner* — Stephen Sherman
(74) *Attorney, Agent, or Firm* — Canon U.S.A., Inc. IP Division

(57) ABSTRACT

An information processing apparatus includes a locus input unit configured to input a locus based on a user's locus input operation, a display unit configured to display the locus input by the locus input unit on a screen, a locus recognition unit configured to recognize the locus input by the locus input unit, and a display changing unit configured to change, based on a size of the locus input by the locus input unit and the locus recognized by the locus recognition unit, the size of the locus.

10 Claims, 13 Drawing Sheets

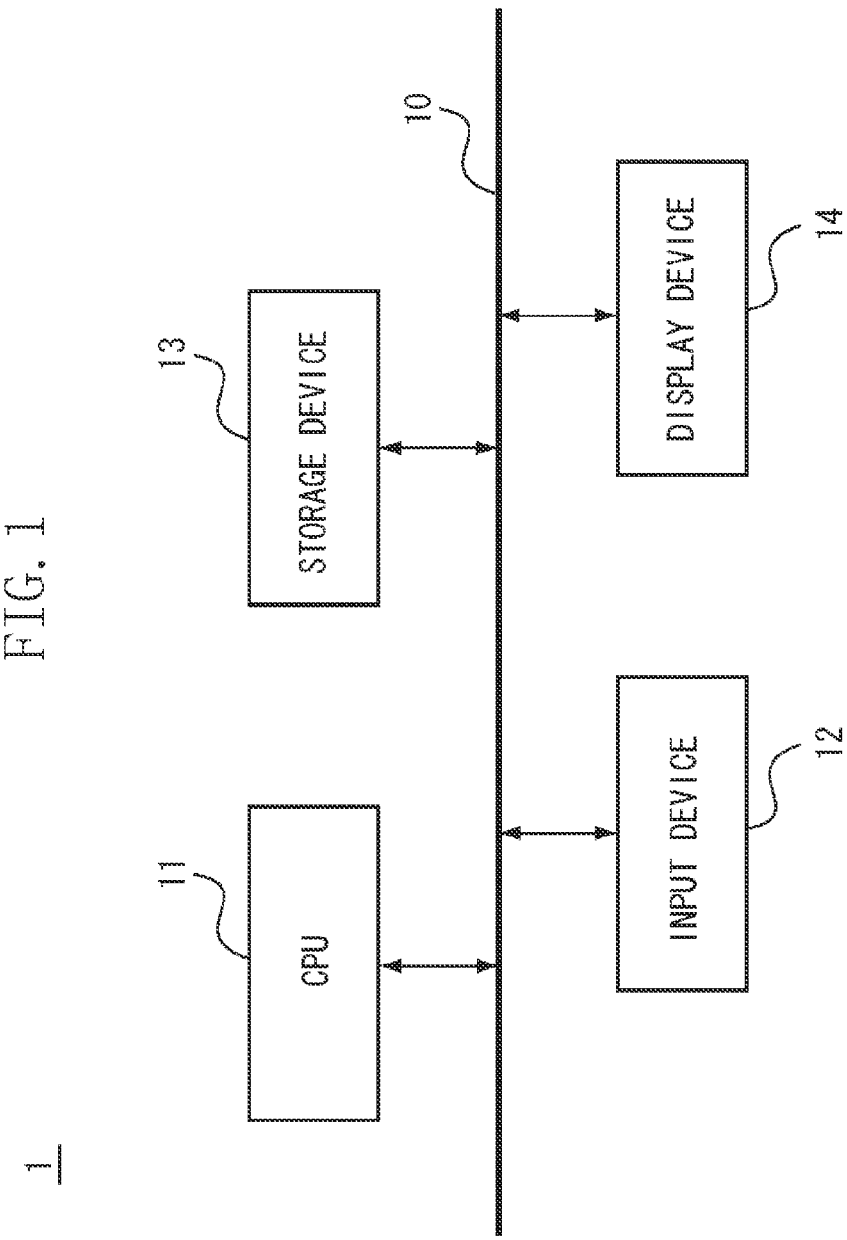

FIG. 7

| GESTURE ID | INSIDE SIZE NECESSARY FOR NEXT GESTURE | OUTSIDE SIZE NECESSARY FOR NEXT GESTURE |
|---|---|---|
| 1 | 45 | 20 |
| 2 | 0 | 0 |
| 3 | 30 | 0 |
| 4 | 0 | 20 |

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

Recent development of digital cameras, hard disk/DVD recorders, portable music players, scanner printer multifunction peripherals, and personal computers has been accompanied by a sharp increase in the number of devices that handle a large-volume of multimedia data such as pictures, moving images, and music. Hence, functions provided in the devices have increased. The increased functions complicate an operation of the devices, increase operation procedures, and complicate a user interface to be operated by a user, thereby causing great distress on the user.

In the personal computer, a user interface is generally used where a function is operated by a pointing device such as a mouse or a touch panel. Recently, in many cases, since touch panels have been employed in a portable telephone, a compact information terminal, the digital camera, and the scanner printer multifunction peripheral, a user can operate these devices easily with intuitive operations. A gesture recognition technology for recognizing a pen or finger operation on the touch panel now enables the pointing device to give multifunctional instructions.

Japanese Patent Application Laid-Open No. 08-263688 discusses a technology of designating graphics that become editing targets by surrounding a part of a drawing displayed on a screen with handwritten closed graphics by a pen operation on a touch panel, and designating an edit processing type by handwriting a gesture close to the closed graphics. This technology enables more multifunctional instructions to be given.

However, the technology discussed in Japanese Patent Application Laid-Open No. 08-263688 has the following problem. The gesture added after the closed graphics are handwritten becomes complex in handwriting, for example, even in a case of a simple gesture of cancellation. The complex gesture forces a user to learn many gestures, causing a possibility of difficult operations.

A solution may be employed which changes processing according to positions of first handwritten closed graphics and a next written gesture. For example, in order to execute processing, a gesture is written in the closed graphics. In order to cancel the processing, the outside of the closed graphics is simply tapped. This method is easily understood by the user, and therefore a user can easily perform operations.

However, the above method may result in a difficulty of clearly defining a positional relationship between the first closed graphics and the next gesture. For example, when the first written closed graphics are too small, it is difficult to write any gestures therein. When the first written closed graphics are too large, tapping outside thereof is difficult.

When the graphics are handwritten not by a pointed pen but by a thick thing such as a finger, it is difficult to draw the graphics as intended. The closed graphics become sizes unsuited for drawing a next gesture, causing difficulty of writing the next gesture.

SUMMARY OF THE INVENTION

The present invention is directed to an information processing apparatus and an information processing method capable of easily inputting instructions by limited gestures without bothering a user.

According to an aspect of the present invention, an information processing apparatus includes a locus input unit configured to input a locus based on a user's locus input operation, a display unit configured to display the locus input by the locus input unit on a screen, a locus recognition unit configured to recognize the locus input by the locus input unit, and a display changing unit configured to change, based on a size of the locus input by the locus input unit and the locus recognized by the locus recognition unit, the size of the locus. The present invention may be an information processing method or a storage medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating an example of a hardware configuration of an input/output device.

FIG. 7 is a table associating a recognition result with a size necessary for a next locus.

DESCRIPTION OF THE EMBODIMENTS

Various exemplary embodiments, features, and aspects of the invention will be described in detail below with reference to the drawings.

Referring to FIG. 1, a hardware configuration of an input/output device, which is an example of an information processing apparatus, will be described. FIG. 1 illustrates an example of the hardware configuration of the input/output device.

As illustrated in FIG. 1, the input/output device includes such a hardware component as a computer constituted of a CPU 11, a storage device 13, an input device 12, and a display device 14. In the present exemplary embodiment, the input device 12 is a touch panel installed on the display device 14. However, other devices such as a mouse, a joystick, and a cross key may be employed as long as the devices can point to an arbitrary point on the display device 14.

In the present exemplary embodiment, each unit of the input/output device described below is realized by executing a program stored in a memory by the CPU 11. However, some or all the units may be realized by hardware.

Figure 2A:
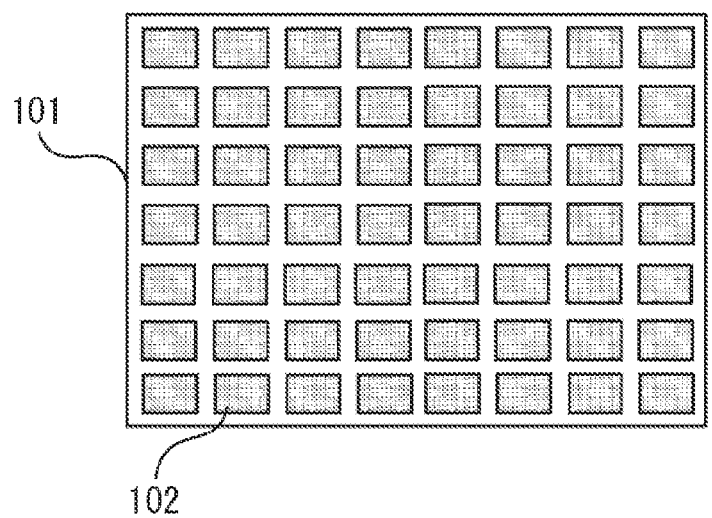
FIGS. 2A and 2B illustrate examples of screens displayed on display devices.
Figure 2B:
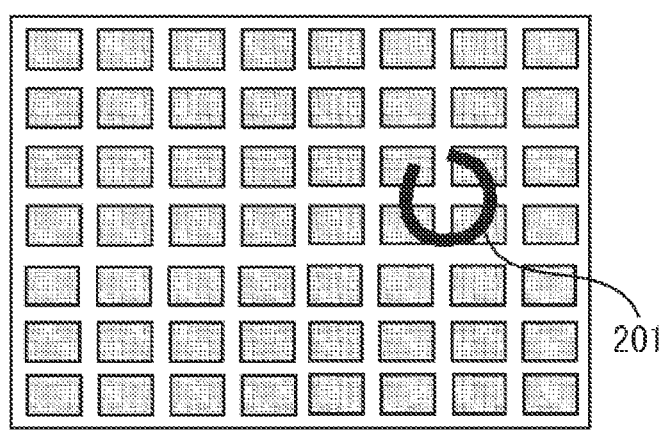

Each of FIGS. 2A and 2B illustrates an example of a screen displayed on the display device. As illustrated in FIG. 2A, a plurality of pictures 102 (i.e., examples of data) is laid out to be displayed on a screen 101. A touch panel is attached onto the screen, which enables a user to input a locus.

FIG. 2B illustrates an example where the user performs a locus input operation to input a locus, and the locus is displayed on the screen. As illustrated in FIG. 2B, the user draws a circle 201 to select some of the pictures laid out on the screen. After the picture selection, when the user draws a numeral in the circle, the selected pictures are printed by a number equal to the drawn numeral. The user can cancel the operation by tapping the outside of the circle.

Figure 3A:
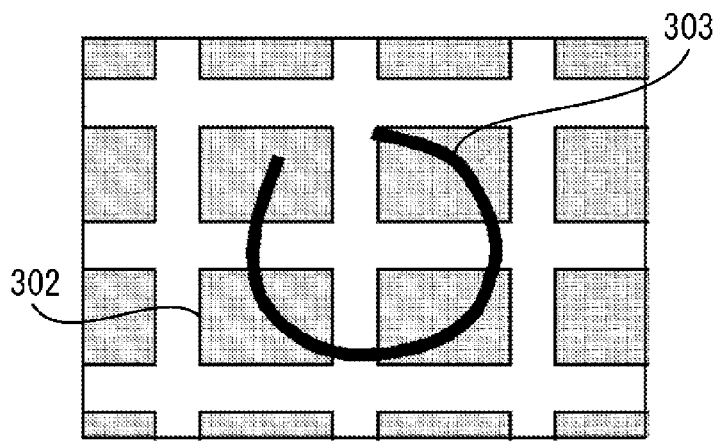
FIGS. 3A and 3B illustrate examples of enlargement of a locus and movement of a position of the locus.

The input/output device of the present exemplary embodiment enlarges, if the circle is not sufficiently large to draw a numeral when the user draws the circle to select some of the pictures, a circle 303 and pictures 302 illustrated in FIG. 3A to sizes enough to draw the numeral. The input/output device moves the circle and the pictures to a center to display the circle and the pictures. Each of FIGS. 3A and 3B illustrates an example of locus enlargement and position movement of the locus.

Figure 3B:
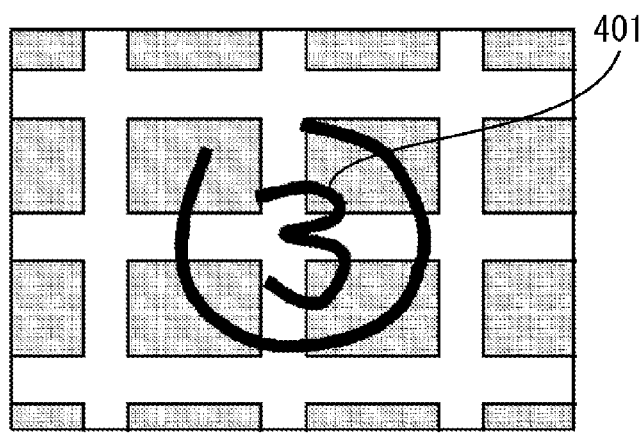

The above processing in the input/output device facilitates writing of a numeral 401 in the circle as illustrated in FIG. 3B. In this case, the input/output device simultaneously enlarges the pictures on which the locus (circle) has been drawn at a magnification equal to that of the locus, and moves the pictures together therewith. Hence, the user can easily understand an association of the drawn locus to the selected pictures. FIG. 3B illustrates an example where the user inputs a locus of a numeral indicating the number of prints in the locus of the circle (closed drawing).

Figure 4A:
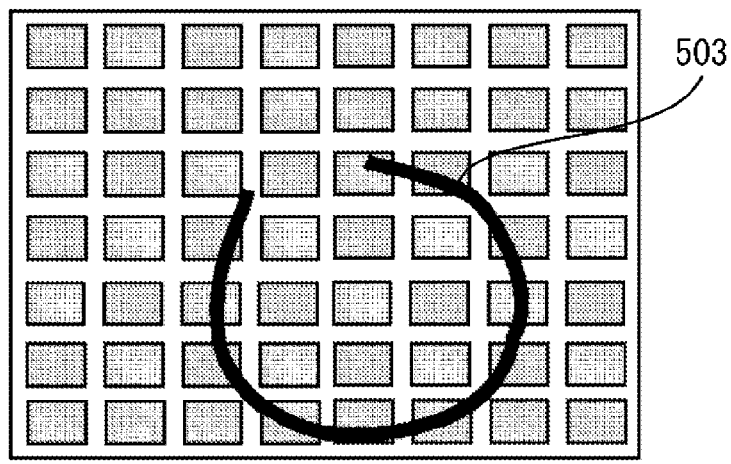
FIGS. 4A and 4B illustrate examples where loci (circles) of a sufficient size with respect to a size required for inputting a numeral that is a next locus are input.
Figure 4B:
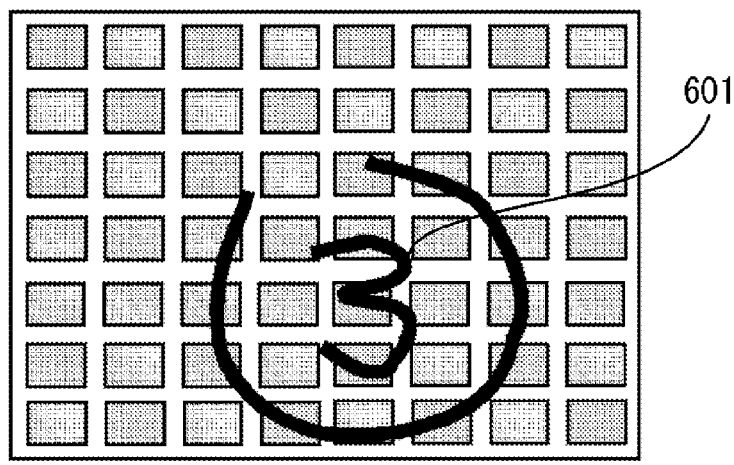

Each of FIGS. 4A and 4B illustrates an example where a locus (circle) sufficiently large for a size required for inputting a numeral (i.e., next locus) is input. When a circle 503 drawn by the user is sufficiently large for a numeral (a numeral 601 in FIG. 4B described below) to be input next as illustrated in FIG. 4A, the input/output device makes no changes in size or position of the locus, or in size or position of the pictures as illustrated in FIG. 4B. FIG. 4B illustrates an example where no change is made in size or position of the locus, or in size or position of the pictures.

Figure 5A:
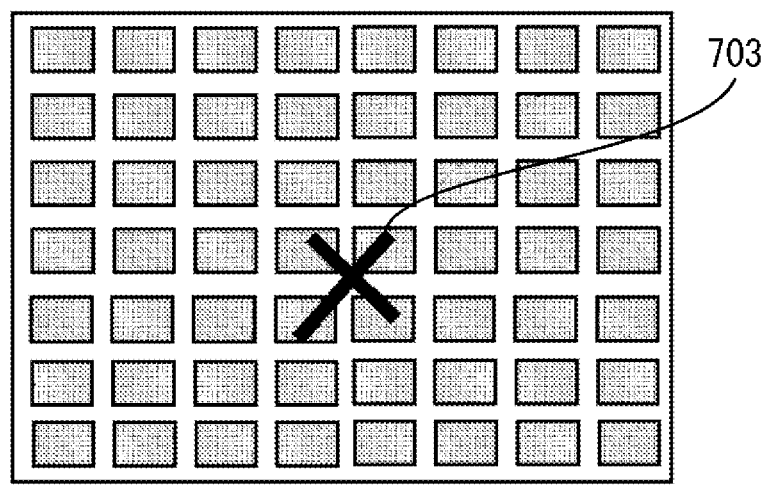
FIGS. 5A and 5B illustrate examples of screens when a user draws "x" as a first locus.
Figure 5B:
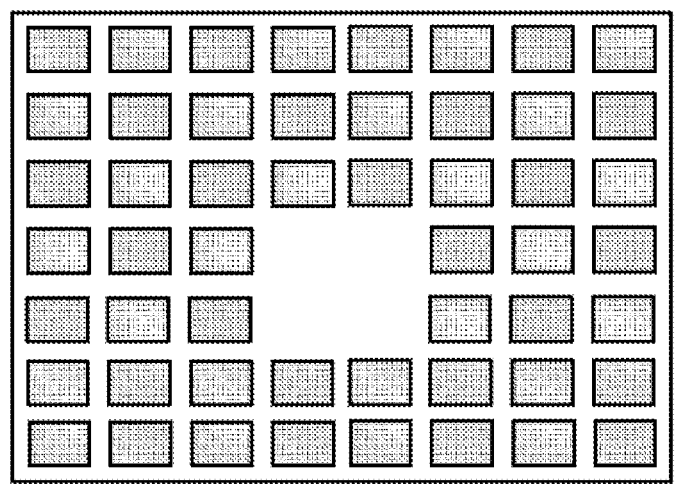

Each of FIGS. 5A and 5B illustrates an example of a screen when the user draws "x" as a first locus. When the user draws x703 as illustrated in FIG. 5A, the input/output device selects pictures on which x has been drawn, and deletes the selected pictures as illustrated in FIG. 5B. FIG. 5B illustrates an example where the pictures are deleted.

A locus to be input next is not necessary for the deletion operation, and hence the input/output device does not enlarge a locus x even if the locus x is drawn small. Thus, the input/output device determines whether to enlarge the first locus and the selected pictures by recognizing not only a size of a drawn locus but also the shape of the locus.

Figure 6:
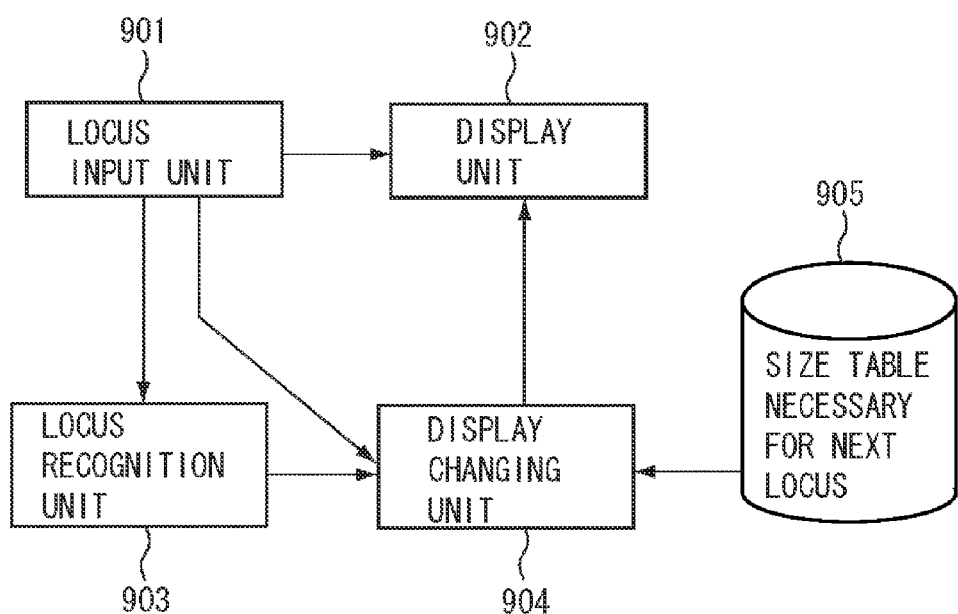
FIG. 6 is a block diagram 1 illustrating an example of a functional configuration of the input/output device.

FIG. 6 illustrates an example 1 of a functional configuration of the input/output device. A locus input unit 901 inputs, based on a user's locus input operation using the input device 12, a locus as movement of a point on a plane. The locus input unit 901 transmits pass data of the locus (locus data) to a display unit 902. The display unit 902 displays the locus on the screen of the display device 14 based on the received pass data. The locus input unit 901 transmits the pass data of the locus to a locus recognition unit 903, and a size of the locus to a display changing unit 904.

The locus recognition unit 903 receives the pass data of the locus from the locus input unit 901, recognizes the locus, and transmits a recognition result to the display changing unit 904. The display changing unit 904 receives the recognition result (locus as a result of recognition) from the locus recognition unit 903, and searches, based on the recognition result, for data in a size table 905 (hereinafter, simply referred to as a table 905) necessary for a next locus. The table 905 is a table, for example, as illustrated in FIG. 7.

Based on storage of a size necessary for a next locus corresponding to the recognition result (locus as a result of recognition) in the table 905, the display changing unit 904 determines whether the next locus is necessary. The table 905 stores a locus and a size necessary for a next locus in association therewith.

The table 905 is stored in, for example, the storage device 13. If no next locus is necessary, the locus recognition unit 903 completes the processing. If a next locus is necessary, the display changing unit 904 obtains a size necessary for the next locus from the table 905.

The display changing unit 904 compares the size necessary for the next locus obtained from the table 905 with a size of the locus received from the locus input unit 901. If the size of the locus received from the locus input unit 901 is smaller than the size necessary for the next locus, the display changing unit 904 instructs the display unit 902 to enlarge the displayed locus according to a magnification obtained from a result of the comparison.

As described above referring to FIG. 3A, the display changing unit 904 may instruct the display unit 902 to move the locus instructed to be enlarged to the center and display the locus.

As described above referring to FIG. 3A, when a locus is input on data such as pictures displayed on the screen, the display changing unit 904 may instruct the display unit 902 to enlarge the displayed data according to the magnification.

As described above referring to FIG. 3A, the display changing unit 904 may instruct the display unit 902 to move the data such as pictures instructed to be enlarged to the center and display the data.

Figure 8:
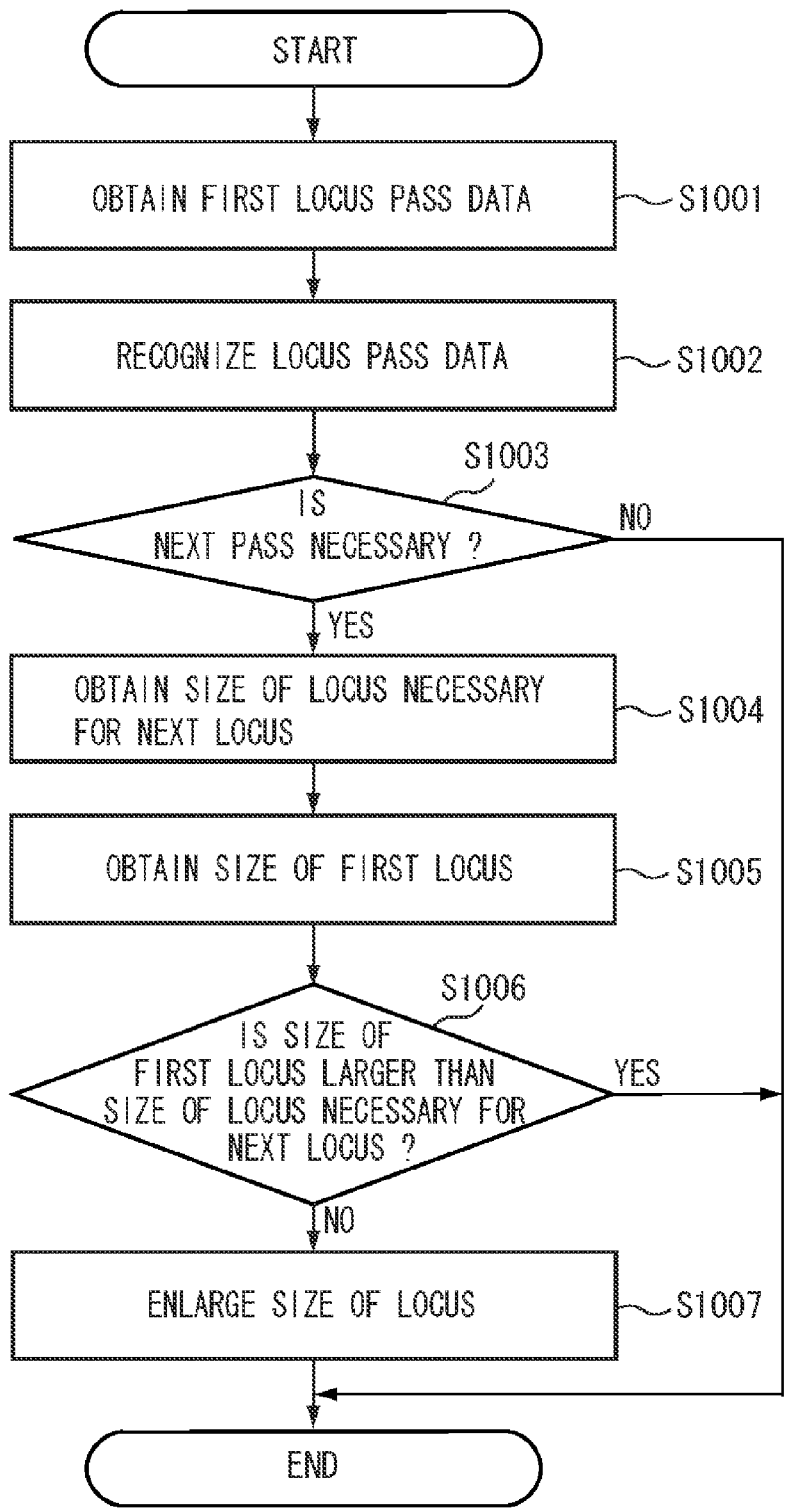
FIG. 8 is a flowchart 1 illustrating an example of display change processing relating to a locus.

FIG. 8 is a flowchart 1 illustrating an example of display changing processing relating to a locus.

In step S1001, the locus input unit 901 obtains pass data of a first locus based on a user's locus input operation using the input device 12. In step S1002, the locus recognition unit 903 recognizes the pass data of the locus obtained in step S1001 to obtain a recognition result.

In step S1003, the display changing unit 904 searches for data in the table 905 based on the recognition result. The display changing unit 904 determines whether a next locus is necessary based on storage of a size necessary for the next locus corresponding to the recognition result (locus as a result of recognition) in the table 905.

If the next locus (pass) is determined to be necessary (YES in step S1003), the display changing unit 904 proceeds the processing to step S1004. If the next locus is determined to be unnecessary (NO in step S1003), the display changing unit 904 finishes the processing illustrated in FIG. 8.

In step S1004, the display changing unit 904 obtains a size of a locus necessary for the next locus from the table 905 based on the recognition result of the locus. In step S1005, the display changing unit 904 obtains a size of the first locus from the locus input unit 901.

In step S1006, the display changing unit 904 compares the obtained size of the first locus with the size of the locus necessary for the next locus. If the obtained size of the first locus is larger than the size of the locus necessary for the next locus (YES in step S1006), the display changing unit 904 finishes the processing illustrated in FIG. 8.

On the other hand, if the obtained size of the first locus is not larger than the size of the locus necessary for the next locus (NO in step S1006), the display changing unit 904 proceeds the processing to step S1007. In other words, the display changing unit 904 proceeds the processing to step S1007 if the size of the locus necessary for the next locus is larger than the obtained size of the first locus.

In step S1007, the display changing unit 904 instructs the display unit 902 to enlarge the displayed locus according to a magnification obtained from a result of the comparison. As described above referring to FIG. 3A, the display changing unit 904 may instruct the display unit 902 to move the locus instructed to be enlarged to the center and display the locus.

As described above referring to FIG. 3A, when a locus is input on data such as pictures displayed on the screen, the display changing unit 904 may instruct the display unit 902 to enlarge the displayed data according to the magnification.

As described above referring to FIG. 3A, the display changing unit 904 may instruct the display unit 902 to move the data such as pictures instructed to be enlarged to the center and display the data.

The present exemplary embodiment has been described by using the pictures as examples of data displayed on the screen. However, the data are not limited to pictures. Data may be graphics, characters, objects, or contents as long as contents of the data can be displayed on the screen.

The present exemplary embodiment has been described assuming that the input/output device includes the table 905. More specifically, in the present exemplary embodiment, the display changing unit 904 searches for data in the table 905 based on the input locus, and determines whether the next locus is necessary based on presence of a size necessary for the locus to be input next. In the present exemplary embodiment, based on the searching result, the display changing unit 904 compares the size necessary for the locus to be input next that is obtained from the table 905 with the size of the input locus.

However, the input/output device may determine whether the locus to be input next is necessary, and a size necessary for the locus to be input without using the table 905. For example, when the recognition result of the locus recognition unit 903 shows that the locus is a predetermined locus (e.g., closed graphics), the display changing unit 904 may determine that the locus to be input next is necessary.

For example, when the recognition result of the locus recognition unit 903 shows that the locus is a predetermined locus (e.g., closed graphics), the display changing unit 904 may automatically determine a size of a locus to be input next. In other words, for example, when the display changing unit 904 is mounted as software, the display changing unit 904 may be subjected to hard coding.

Differences of the present exemplary embodiment from the first exemplary embodiment will mainly be described below. A hardware configuration is similar to that of the first exemplary embodiment.

Figure 9A:
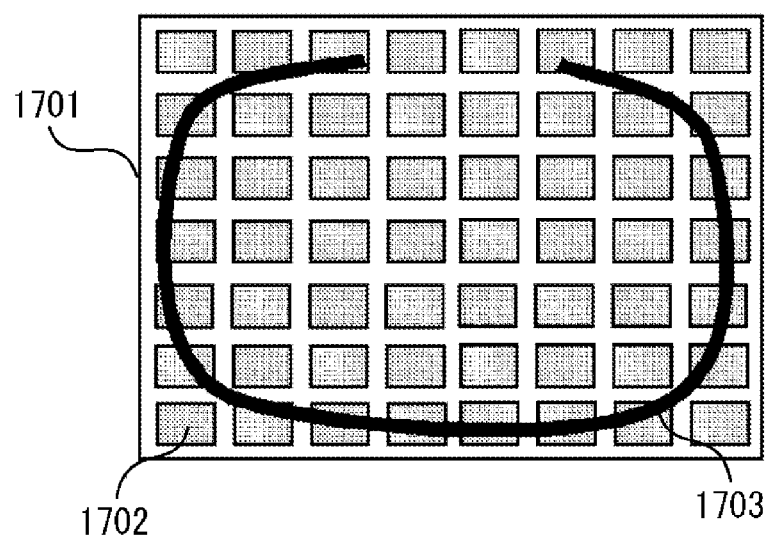
FIGS. 9A and 9B illustrate examples 1 where loci are input to be displayed respectively on the screens based on a user's locus input operation.
Figure 9B:
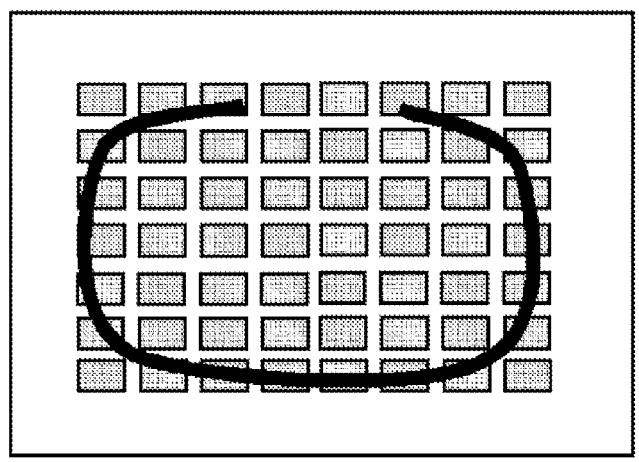

Each of FIGS. 9A and 9B illustrates an example 1 where a locus is input to be displayed on a screen based on a user's locus input operation. The present exemplary embodiment will be described assuming that pictures 1702 are laid out on a screen 1701. A touch panel is attached to the screen, which enables a user to input a locus.

As illustrated in FIG. 9A, the user draws a circle 1703 to select pictures laid out on the screen. After the picture selection, when the user draws a numeral in the circle, the selected pictures are printed by a number equal to the drawn numeral. The user can cancel the operation by tapping the outside of the circle.

In the present exemplary embodiment, processing of tapping the outside of the circle performed by the user to cancel the operation will be described. The circle input on the screen of FIG. 9A is too large for the screen, and hence there is no area enough to input a next locus outside the locus for canceling the operation, causing a difficulty of inputting the next locus for the user. Thus, in the present exemplary embodiment, as illustrated in FIG. 9B, an input/output device reduces a locus that is input first and pictures, thereby facilitating inputting of a next locus.

Figure 10:
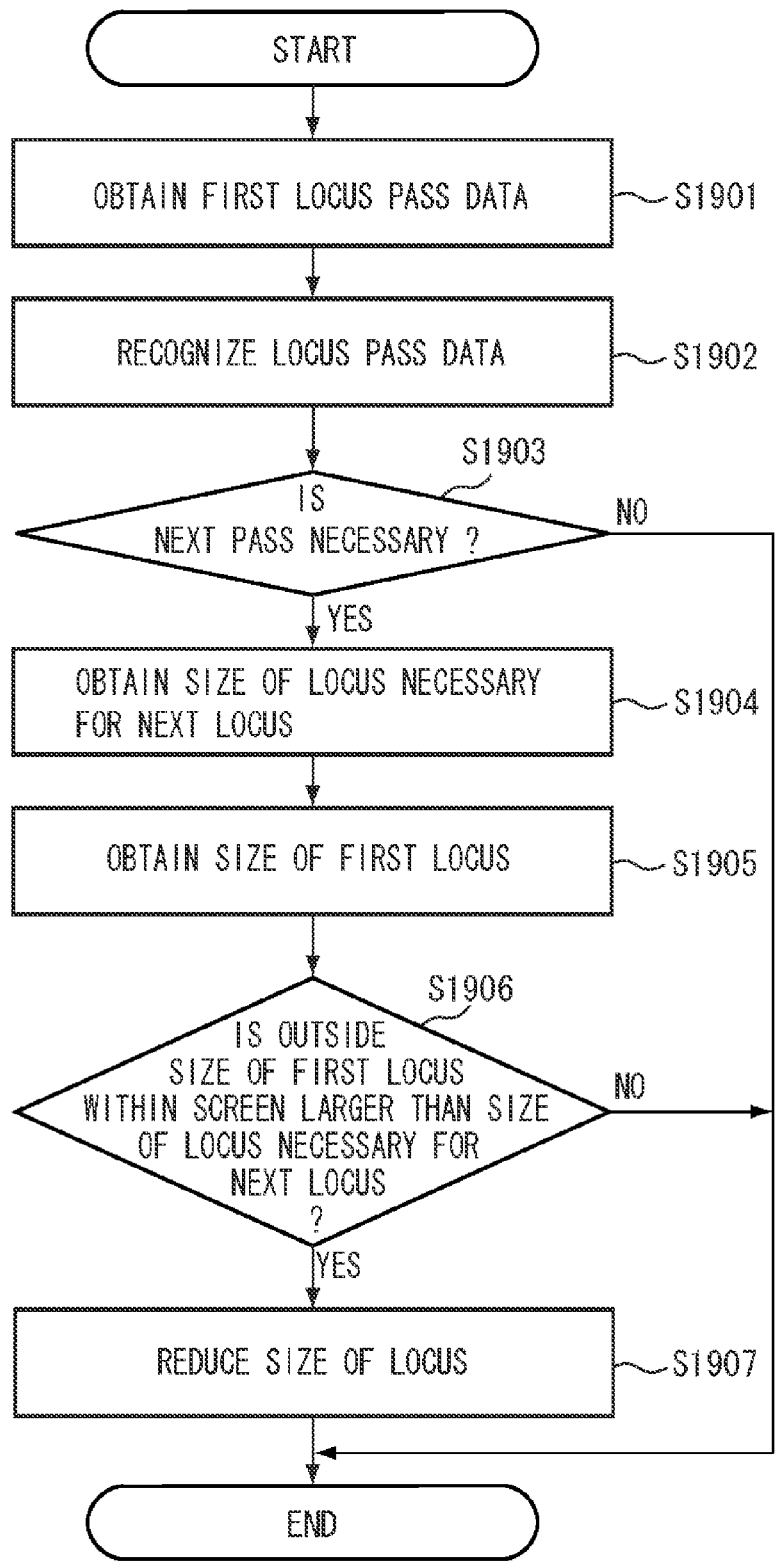
FIG. 10 is a flowchart 2 illustrating an example of a display change processing relating to a locus.

FIG. 10 is a flowchart 2 illustrating an example of display changing processing relating to a locus.

In step S1901, a locus input unit 901 obtains pass data of a first locus based on a user's locus input operation using an input device 12. In step S1902, the locus recognition unit 903 recognizes the pass data of the locus obtained in step S1901 to obtain a recognition result.

In step S1903, a display changing unit 904 searches for data in a table 905 based on the recognition result. The display changing unit 904 determines whether a next locus is necessary based on storage of a size necessary for the next locus corresponding to the recognition result (locus as a result of recognition) in the table 905.

If the next locus (pass) is determined to be necessary (YES in step S1903), the display changing unit 904 proceeds the processing to step S1904. If the next locus is determined to be unnecessary (NO in step S1903), the display changing unit 904 finishes the processing illustrated in FIG. 10.

In step S1904, the display changing unit 904 obtains a size of a locus necessary for the next locus from the table 905 based on the recognition result of the locus. In step S1905, the display changing unit 904 obtains a size of the first locus from the locus input unit 901.

In step S1906, the display changing unit 904 compares the obtained size of the first locus with the size of the locus necessary for the next locus. If the obtained outside size of the first locus is larger than the size of the locus necessary for the next locus (YES in step S1906), the display changing unit 904 proceeds the processing to step S1907. On the other hand, if the obtained outside size of the first locus within the screen is not larger than the size of the locus necessary for the next locus (NO in step S1006), the display changing unit 904 finishes the processing illustrated in FIG. 10.

In step S1907, the display changing unit 904 instructs a display unit 902 to reduce the displayed locus according to a magnification obtained from a result of the comparison. As described above referring to FIG. 3A, the display changing unit 904 may instruct the display unit 902 to move the locus instructed to be reduced to the center and display the locus.

As described above referring to FIG. 3A, when a locus is input on data such as pictures displayed on the screen, the display changing unit 904 may instruct the display unit 902 to display the data according to the magnification.

As described above referring to FIG. 3A, the display changing unit 904 may instruct the display unit 902 to move the data such as pictures instructed to be reduced to the center and display the data.

Differences of the present exemplary embodiment from the above-described exemplary embodiments will mainly be described below.

Figure 11A:
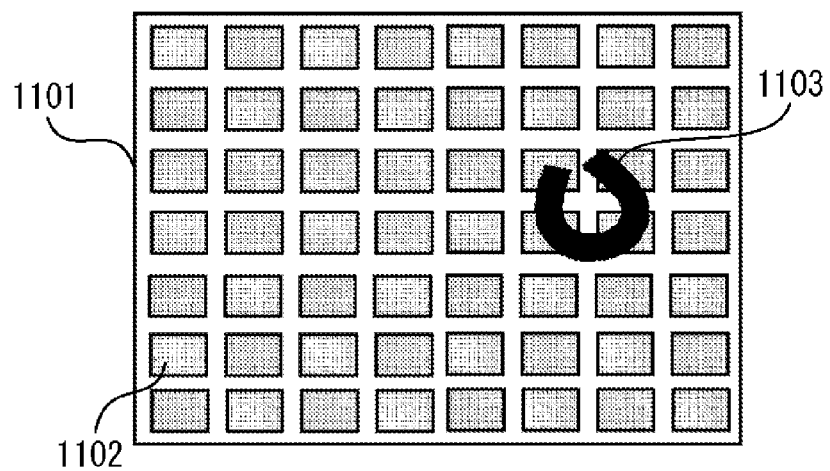
FIGS. 11A and 11B illustrate examples 2 where loci are input to be displayed respectively on the screens based on a user's locus input operation.
Figure 11B:
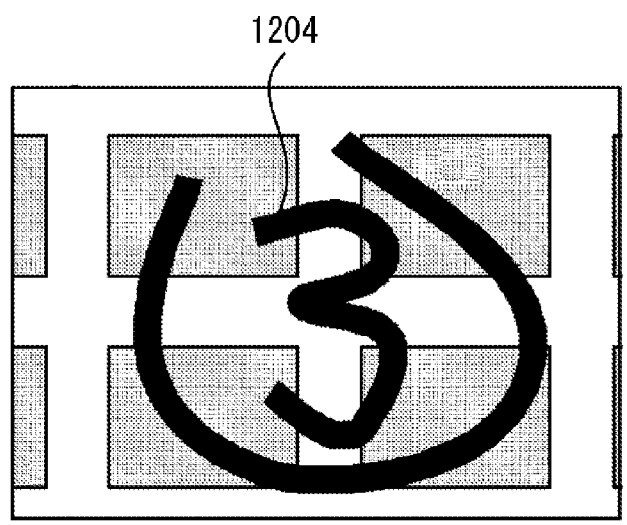

Each of FIGS. 11A and 11B illustrates an example 2 where a locus is input to be displayed on a screen based on a user's locus input operation. The present exemplary embodiment will be described assuming that pictures 1102 are laid out on a screen 1101. A touch panel is attached to the screen, which enables a user to input a locus.

As illustrated in FIG. 11A, the user draws a circle 1103 to select pictures laid out on the screen. After the picture selection, when the user draws a numeral in the circle, the selected pictures are printed by a number equal to the drawn numeral. The user can cancel the operation by tapping the outside of the circle.

Figure 12:
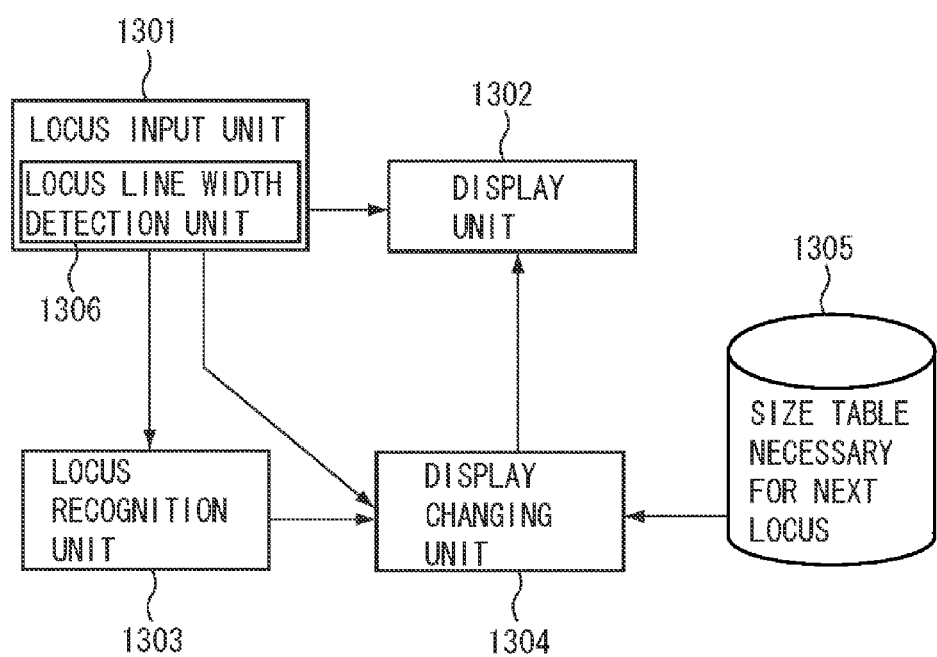
FIG. 12 is a block diagram 2 illustrating an example of a functional configuration of the input/output device.

As illustrated in FIG. 12 described below, an input/output device of the present exemplary embodiment includes a locus line width detection unit configured to detect a line width of a locus character-input from a touch panel. Thus, a locus is displayed with a small line width when the user inputs the locus by a pen, or with a large line width when the user inputs the locus by a finger.

In the input/output device of the present exemplary embodiment, when the user draws a circle to select pictures, if a size of a locus including a line width thereof is not enough for a size of a numeral to be drawn next, as illustrated in FIG. 11B, the circle and the pictures that have been drawn are enlarged to sizes suited for drawing a numeral 1204.

In the present exemplary embodiment, the circle and the pictures drawn by the user are moved to the center and displayed. FIG. 11B illustrates an example where the user inputs a locus of a numeral representing a number of prints in the locus of the circle as closed graphics.

In the present exemplary embodiment, an enlargement magnification varies according to the line width of a locus. Hence, irrespective of a line width of a locus, a numeral can be written more easily in the circle as illustrated in FIG. 11B. In the input/output device of the present exemplary embodiment, a magnification is greater as a line width is larger. In this case, the input/output device enlarges, together with the locus, the pictures by an equal magnification to move the pictures. As a result, the user can easily associate the selected pictures with the input locus.

FIG. 12 is a block diagram illustrating an example 2 of a functional configuration of the input/output device.

A locus input unit 1301 inputs, based on a user's locus input operation using an input device 12, a locus as movement of a point on a plane. The locus input unit 1301 of the present exemplary embodiment includes a locus line width detection unit 1306 configured to detect a width of a locus. The locus input unit 1301 transmits pass data of the locus (locus data) to a display unit 1302, and a width of the locus detected by the locus line width detection unit 1306.

Thus, the display unit 1302 can display a locus on a screen of a display device 14 so as to clarify a difference between a pen input and a finger input. The locus input unit 1301 transmits the pass data of the locus to a locus recognition unit 1302, and a size of the locus and a regulated width to a display changing unit 1304.

The locus recognition unit 1303 receives the pass data of the locus from the locus input unit 1301, recognizes the locus, and transmits a recognition result to the display changing unit 1304.

The display changing unit 1304 receives the recognition result (locus as a result of recognition) from the locus recognition unit 1303, and searches, based on the recognition result, for data in a size table 1305 (hereinafter, simply referred to as a table 1305) necessary for a next locus.

Based on storage of a size necessary for a next locus corresponding to the recognition result (locus as a result of recognition) in the table 1305, the display changing unit 1304 determines whether the next locus is necessary. The table 1305 stores a locus and a size necessary for a next locus of the locus in association therewith. The table 1305 is stored in, for example, a storage device 13.

If no next locus is necessary, the locus recognition unit 1303 completes the processing. If a next locus is necessary, the display changing unit 1304 obtains a size necessary for the next locus from the table 1305.

The display changing unit 1304 compares the size necessary for the next locus obtained from the table 1305 with a size of the locus received from the locus input unit 1301.

If the size of the locus received from the locus input unit 1301 is smaller than the size necessary for the next locus, the display changing unit 1304 compares a line width of the locus received from the locus line width detection unit 1306 (or the locus input unit 1301) with, for example, a predetermined reference line width. The display changing unit 1304 instructs the display unit 1302 to multiply a magnification of the size obtained in the size comparison by a magnification of the line width obtained as a result of the comparison, and enlarge the displayed locus.

As described above referring to FIG. 3A, the display changing unit 1304 may instruct the display unit 1302 to move the locus instructed to be enlarged to the center and display the locus.

When a locus is input on data such as pictures displayed on the screen, the display changing unit 1304 may instruct the display unit 1302 to enlarge the displayed data according to the enlargement magnification of the locus instructed to the display unit 1302.

The display changing unit 1304 may instruct the display unit 1302 to move the data such as pictures instructed to be enlarged to the center and display the data. The reference line width may be predetermined, or set (edited) by the user as necessary.

Figure 13:
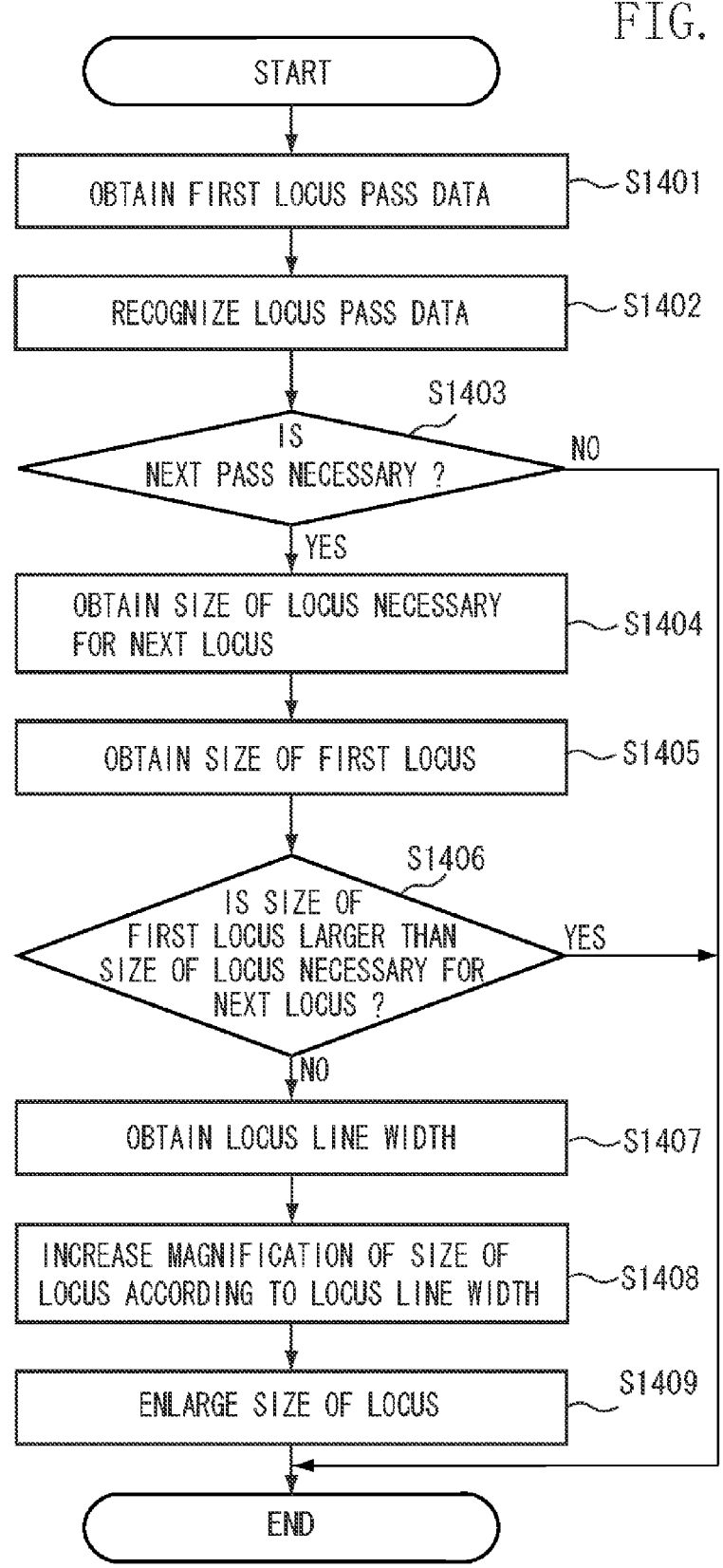
FIG. 13 is a flowchart 3 illustrating an example of display change processing relating to a locus.

FIG. 13 is a flowchart 3 illustrating an example of display changing processing relating to a locus.

In step S1401, the locus input unit 1301 obtains pass data of a first locus based on a user's locus input operation using the input device 12. In step S1402, the locus recognition unit 1303 recognizes the pass data of the locus obtained in step S1401 to obtain a recognition result.

In step S1403, the display changing unit 1304 searches for data in the table 1305 based on the recognition result. The display changing unit 1304 determines whether a next locus is necessary based on storage of a size necessary for the next locus corresponding to the recognition result (locus as a result of recognition) in the table 1305.

If the next locus (pass) is determined to be necessary (YES in step S1403), the display changing unit 1304 proceeds the processing to step S1404. If the next locus is determined to be unnecessary (NO in step S1403), the display changing unit 1304 finishes the processing illustrated in FIG. 13.

In step S1404, the display changing unit 1304 obtains a size of a locus necessary for the next locus from the table 1305 based on the recognition result of the locus. In step S1405, the display changing unit 1304 obtains a size of the first locus from the locus input unit 1301.

In step S1406, the display changing unit 1304 compares the obtained size of the first locus with the size of the locus necessary for the next locus. If the obtained size of the first locus is larger than the size of the locus necessary for the next locus (YES in step S1406), the display changing unit 1304 finishes the processing illustrated in FIG. 13. On the other hand, if the obtained size of the first locus is not larger than the size of the locus necessary for the next locus (NO in step S1406), the display changing unit 1304 proceeds the processing to step S1407.

In step S1407, the display changing unit 1304 obtains a line width of the locus (width of a locus line) from the locus line width detection unit 1306 (or the locus input unit 1301). In step S1408, the display changing unit 1304 increases a magnification of the size of the locus calculated as a result of the locus size comparison according to the line width of the locus obtained in step S1407.

More specifically, the display changing unit 1304 compares the line width of the locus obtained in step S1407 with, for example, a predetermined reference line width. The display changing unit 1304 multiplies a magnification of the line width obtained as a result of the comparison by a magnification of the size obtained in the size comparison, thereby increasing a size magnification of the locus.

In step S1409, the display changing unit 1304 instructs the display unit 1302 to enlarge the displayed locus according to the increased magnification determined in step S1408. The display changing unit 1304 may instruct the display unit 1302 to move the locus instructed to be enlarged to the center and display the locus.

When a locus is input on data such as pictures displayed on the screen, the display changing unit 1304 may instruct the display unit 1302 to enlarge the displayed data according to the determined magnification. The display changing unit 1304 may instruct the display unit 1302 to move the data such as pictures instructed to be enlarged to the center and display the data.

The objects of the above-mentioned exemplary embodiments are achieved as follows. That is, a storage medium (or recording medium) recording program codes of software to realize the functions of the exemplary embodiments is supplied to the system or the apparatus. A central processing unit (CPU or MPU) of the system or the apparatus reads and executes the program codes stored in the storage medium. In this case, the program codes themselves read from the storage medium realize the functions of the exemplary embodiments, and the storage medium recording the program codes is included within the exemplary embodiments.

By executing the program codes read by the CPU (or MPU) of the system or the apparatus, based on instructions of the program codes, an operating system (OS) operated in the system or the apparatus performs some or all parts of actual processing. A case where the processing realizes the functions of the exemplary embodiments is included within the exemplary embodiment.

The program codes read from the storage medium are written in a memory provided in a function expansion card inserted into the system or the apparatus or a function expansion unit connected to the system or the apparatus. Then, based on instructions of the program codes, a CPU provided in the function expansion card or the function expansion unit performs some or all parts of actual processing. A case where the processing realizes the functions of the exemplary embodiment is included within the exemplary embodiments.

When the exemplary embodiments are applied to the storage medium, the program codes corresponding to the aforementioned flowcharts are stored in the storage medium.

According to each of the exemplary embodiments, when a first gesture is drawn and then a next gesture is drawn, the first gesture is recognized, and a position or a size of the first gesture is changed so as to facilitate understanding of a positional relationship with the next gesture. Thus, the user can write the next gesture while clearly distinguishing its positional relationship with the first gesture.

As a result, the user can greatly reduce time and labor of inputting gestures, and easily input gestures without any troubles. In other words, according to each of the exemplary embodiments, without troubling the user, instructions can be easily input with limited gestures.

The exemplary embodiments have been described in detail. However, the present invention is not limited to the specific exemplary embodiments. Various modifications and changes can be made within a spirit and a scope of the present invention as specified in appended claims.

As described above, according to the present invention, without troubling the user, instructions can be easily input with limited gestures.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-116839 filed May 13, 2009, which is hereby incorporated by reference herein in its entirety.

What is claimed is:

1. An information processing apparatus comprising:
a locus input unit configured to input a locus based on a user's locus input operation;
a display unit configured to display the locus input by the locus input unit on a screen;
a first obtaining unit configured to obtain a size of the locus input by the locus input unit;
a second obtaining unit configured to obtain a size of an area necessary for inputting a next locus which is to be input next in the input locus, before the next locus is input;
a determination unit configured to determine whether the size of area necessary for inputting the next locus exists within the input locus, based on the size obtained by the first obtaining unit and the size obtained by the second obtaining unit; and
a display changing unit configured to change a size of the locus displayed on the screen by the display unit, in a case where the determination unit determines that the size of area necessary for inputting the next locus does not exist within the input locus.

2. The information processing apparatus according to claim 1, wherein the display changing unit enlarges a size of the locus displayed on the screen by the display unit, in a case where the determination unit determines that the size of area necessary for inputting the next locus does not exist within the input locus.

3. The information processing apparatus according to claim 1, further comprising a third obtaining unit configured to obtain a size of an area necessary for inputting a next locus which is to be input next on the outside of the input locus, before the next locus is input,
wherein the determination unit determines whether the size of area necessary for inputting the next locus exists outside of the input locus, based on the size obtained by the first obtaining unit and the size obtained by the third obtaining unit, and
wherein the display changing unit reduces a size of the locus displayed on the screen by the display unit, in a case where the determination unit determines that the size of area necessary for inputting the next locus does not exist outside of the input locus.

4. The information processing apparatus according to claim 1,
wherein the locus input unit includes a detection unit configured to detect a width of a locus to be input, and
wherein the determination unit determines whether a size of area necessary for inputting the next locus in the width detected by the detection unit exists within the input locus.

5. The information processing apparatus according to claim 4, wherein in order to display the area necessary to input the next locus on the screen, the display changing unit obtains magnification of the width of the locus detected by the detection unit based on a predetermined reference line width, and changes a size of the locus displayed by the display unit according to the obtained magnification.

6. The information processing apparatus according to claim 1,
wherein the display changing unit changes, at a magnification equal to a magnification used when a size of the locus displayed on the screen by the display unit is changed, a size of data displayed under the locus input by the locus input unit.

7. The information processing apparatus according to claim 6, wherein the display changing unit changes a size of locus displayed by the display unit and changes a display position where the locus is displayed on the screen.

8. The information processing apparatus according to claim 1,
wherein the display changing unit changes, at a magnification equal to a magnification used when a size of the locus displayed on the screen by the display unit is changed, a size of data displayed under the locus input by the locus input unit, and changes display positions of the data and the locus displayed on the screen by the display unit.

9. An information processing method, comprising:
inputting, by an information processing apparatus, a locus based on a user's locus input operation;
displaying, by the information processing apparatus, the locus input in the locus input step on a screen;
recognizing, by the information processing apparatus, the input locus;
obtaining a size of the input locus;
obtaining a size of an area necessary for inputting a next locus which is to be input next in the input locus, before the next locus is input;
determining whether the size of area necessary for inputting the next locus exists within the input locus, based on the obtained size of the input locus and the obtained size of the area; and
changing a size of the locus displayed on the screen, in a case where it is determined that the size of area necessary for inputting the next locus does not exist within the input locus.

10. A non-transitory computer-readable storage medium for storing a program that causes a computer to execute a method comprising:
inputting, by an information processing apparatus, a locus based on a user's locus input operation;
displaying, by the information processing apparatus, the locus input in the locus input step on a screen;
recognizing, by the information processing apparatus, the input locus;
obtaining a size of the input locus;
obtaining a size of an area necessary for inputting a next locus which is to be input next in the input locus, before the next locus is input;
determining whether the size of area necessary for inputting the next locus exists within the input locus, based on the obtained size of the input locus and the obtained size of the area; and
changing a size of the locus displayed on the screen, in a case where it is determined that the size of area necessary for inputting the next locus does not exist within the input locus.

\* \* \* \* \*